United States Patent
Bugnon

(10) Patent No.: US 6,827,775 B2
(45) Date of Patent: Dec. 7, 2004

(54) RHEOLOGY IMPROVERS AND PIGMENT COMPOSITIONS HAVING IMPROVED RHEOLOGY

(75) Inventor: Philippe Bugnon, Essert (CH)

(73) Assignee: Ciba Specialty Chemicals Corporation, Tarrytown, NY (US)

(*) Notice: Subject to any disclaimer, the term of this patent is extended or adjusted under 35 U.S.C. 154(b) by 0 days.

(21) Appl. No.: 10/450,034

(22) PCT Filed: Dec. 4, 2001

(86) PCT No.: PCT/EP01/14178

§ 371 (c)(1),
(2), (4) Date: Jun. 10, 2003

(87) PCT Pub. No.: WO02/48269

PCT Pub. Date: Jun. 20, 2002

(65) Prior Publication Data

US 2004/0035324 A1 Feb. 26, 2004

(30) Foreign Application Priority Data

Dec. 13, 2000 (CH) .............................. 2428/00
Sep. 5, 2001 (CH) .............................. 1646/01

(51) Int. Cl.[7] .......................... C09B 69/02; C09B 67/22
(52) U.S. Cl. ..................... 106/493; 106/494; 106/495; 106/496; 106/497; 106/498; 106/499; 524/84; 524/87; 524/89; 524/90; 524/94; 524/166
(58) Field of Search ................................ 106/493, 494, 106/495, 496, 497, 498, 499, 410, 411; 524/84, 87, 89, 90, 94, 166

(56) References Cited

U.S. PATENT DOCUMENTS

| | | | |
|---|---|---|---|
| 3,754,958 A | 8/1973 | Giambalvo | 106/308 |
| 4,055,440 A | 10/1977 | Wheeler et al. | 106/288 |
| 4,680,057 A | 7/1987 | Hays | 106/23 |
| 4,692,189 A | 9/1987 | Bäbler et al. | 106/308 |
| 4,726,847 A | 2/1988 | Wanser | 106/308 |
| 4,791,204 A | 12/1988 | Jost et al. | 548/101 |
| 4,863,522 A | 9/1989 | Jost et al. | 106/494 |
| 4,865,650 A | 9/1989 | von der Crone et al. | 106/494 |
| 5,145,524 A | 9/1992 | Ganci | 106/493 |
| 5,264,034 A | 11/1993 | Dietz et al. | 106/493 |
| 5,271,759 A | 12/1993 | Wooden et al. | 106/411 |
| 5,275,653 A | 1/1994 | Dietz et al. | 106/498 |
| 5,380,870 A | 1/1995 | Hari et al. | 548/453 |
| 5,840,907 A | 11/1998 | Hendi | 546/256 |
| 2001/0008912 A1 | 7/2001 | Weber et al. | 524/92 |

FOREIGN PATENT DOCUMENTS

| | | |
|---|---|---|
| DE | 4037556 | 5/1991 |
| EP | 0224445 | 6/1987 |
| EP | 0430875 | 6/1991 |
| EP | 0504922 | 9/1992 |
| EP | 0638615 | 2/1995 |
| GB | 2238550 | 6/1991 |

OTHER PUBLICATIONS

Derwent Abstract 1982–16611E for JP 57012067 (Jan. 1982).
Derwent Abstract 1987–260989 [37] for JP 62181373 (Aug. 1987).
English abstract for EP 0430875 (Jun. 1991).

Primary Examiner—Anthony J. Green
(74) Attorney, Agent, or Firm—Tyler A. Stevenson

(57) ABSTRACT

The invention relates to a compound of the 1-aminoanthraquinone, anthanthrone, anthrapyrimidine, quinacridone, dioxazine, diketopyrrolopyrrole, flavanthrone, indanthrone, isoindolinone, isoviolanthrone, perinone, perylene, phthalocyanine, pyranthrone or thioindigo series, which compound has one or more sulfonate groups of formula (1) wherein $R_1$ is methyl or ethyl, $R_2$, $R_3$ and $R_4$ are each independently of the others $C_6-C_{24}$alkyl or $C_6-C_{24}$alkenyl, m is a number from 0.3 to 1.0 and n is a number from 0 to (1.0 m), the compound being suitable for use as a pigment dispersant and rheology improver. Also claimed are modified pigments having that compound on their surface, and also pigment compositions and dispersions comprising that compound.

(I)

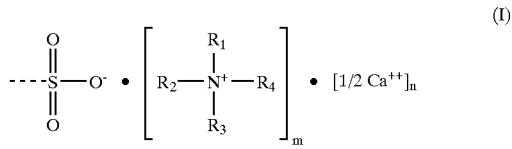

18 Claims, No Drawings

RHEOLOGY IMPROVERS AND PIGMENT COMPOSITIONS HAVING IMPROVED RHEOLOGY

By virtue of their planar chromophore structure, polycyclic and heterocyclic pigments have many properties in common: they are virtually insoluble, even at high processing temperatures, and exhibit very good fastness properties, for example excellent stability towards light, weathering and heat. On the other hand, they exhibit poor dispersibility and the rheology of compositions comprising them still leaves something to be desired.

It has long been known that certain application-related properties of organic pigments can be improved by the addition of dispersants. Pigment derivatives, including a large number of sulfonates, have proved to be especially suitable dispersants.

U.S. Pat. No. 5,271,759 discloses pigment compositions comprising organic pigments having a wide variety of chromophores, a sulfonated pigment derivative and a polymeric quaternary ammonium salt, which pigment compositions are said to have good rheology in surface-coatings and printing inks and to allow warp-free pigmenting of polyolefins. Sulfonated diketopyrrolopyrrole sulfonates and phthalocyanine sulfonates are given as examples, the polymeric counter-ion being, for example, poly(N,N-dimethyl-3,5-dimethylenepiperidinium) or the cationic amine/formaldehyde condensate ®Tinofix EW.

U.S. Pat. Nos. 3,754,958, 4,055,440, JP-A-62/181373, U.S. Pat. No. 4,726,847 and EP-A-0 638 615 relate to modified phthalocyanine pigments. Compared with a more highly sulfonated product, according to U.S. Pat. No. 3,754,958 an only partially sulfonated pigment having the same counter-ion exhibits improved colour strength, gloss and transparency, there being disclosed as cation $C_8$–$C_{14}$alkyltrimethylammonium. In contrast, U.S. Pat. No. 4,055,440 discloses the improvement in the rheology of a more highly sulfonated product by the use of dehydroabietylamine. The fluidity of inks is increased in JP-A-62/181373 by sulfonated phthalocyanines with quaternary ammonium ions having from 15 to 40 carbon atoms, of which from 12 to 18 have to be in an alkyl group; in the Examples, didodecyldimethylammonium and dimethyldioctadecylammonium are disclosed. Similarly, EP-A-0 638 615 discloses a process for the preparation of a pigment having improved gloss, dispersibility, fluidity and colour strength by the wet-grinding of copper phthalocyanine together with an ammonium salt of a sulfonated copper phthalocyanine, there being disclosed as ammonium cations inter alia didodecyldimethylammonium and hexadecyltrimethylammonium. According to U.S. Pat. No. 4,726,847, the rheological and optical properties of a composition consisting of a phthalocyanine pigment and a sulfonated phthalocyanine can be improved by coating with a combination of anionic and cationic surfactants, there being used as surfactant inter alia ®Ethomeen S/12 [61-24-0].

U.S. Pat. Nos. 4,791,204, 5,145,524, EP-A-0 430 875, EP-A-1 104 789, GB-B-2 238 550, U.S. Pat. Nos. 5,380,870 and 5,840,907 relate to diketopyrrolopyrrole pigment compositions. Rheology, stability towards heat and warping characteristics of diketopyrrolopyrrole pigments are improved according to U.S. Pat. No. 4,791,204 by the addition of modified diketopyrrolopyrroles, including, among a large number of possibilities, ammonium sulfonates, for example a hexamethylenediamine salt. A further improvement in rheology is achieved in U.S. Pat. No. 5,145,524 by the addition of certain amounts of an alkoxyvinyl polymer as viscosity index improver. Both in the case of diketopyrrolopyrroles and in the case of quinacridones, EP-A-0 430 875 prefers certain sulfonates, the storage stability being increased and flooding and the tendency towards flocculation being reduced; in one example hexadecyltrimethylammonium is disclosed as cation. In EP-A-1 104 789, sulfonated derivatives of Pigment Red 264 are used instead of those of Pigment Red 254. Rheology and colour saturation are again increased in GB-B-2 238 550 by the use of special diketopyrrolopyrrole sulfonate mixtures instead of single sulfonates, there being mentioned as counter-ion inter alia a hexadecyltrimethylammonium salt. Conversely, U.S. Pat. No. 5,380,870 discloses sulfonated diketopyrrolopyrroles which, owing to mixed counter-ions, exhibit increased colour strength and a high degree of dispersibility as well as fastness to heat and to light. More specific, N-substituted diketopyrrolopyrroles are the subject of U.S. Pat. No. 5,840,907, it being possible for those products too to be partially sulfonated and to be present, for example, also in the form of acetyltrimethylammonium or benzyltributylammonium salt.

In the case of Pigment Red 177, a dianthraquinonyl pigment of the 1-aminoanthraquinone series, according to U.S. Pat. No. 4,863,522 the rheological properties can likewise be improved by the addition of a sulfonated derivative, there being disclosed as the cation thereof inter alia tetramethylammonium. Similar subject matter is disclosed by U.S. Pat. No. 4,692,189 in the case of indanthrone blue (Pigment Blue 60) where, in addition to an improvement in rheology, the colour strength and gloss are also improved, and by U.S. Pat. No. 4,865,650 in the case of isoindolinones where, in addition to an improvement in rheology, the dispersion stability, and tendency towards flocculation are also improved. According to U.S. Pat. No. 5,264,034, rheology, dispersibility, flocculation stability, colour strength, transparency and surface properties are improved in similar manner also in the case of perylenes, it being possible for the perylene sulfonates also to be in the form of ammonium salts, for example in the form of stearyl-ammonium salts. Finally, U.S. Pat. No. 5,275,653 discloses compositions comprising a dioxazine pigment (Pigment Violet 23) and a sulfonated derivative thereof (for example in the form of a calcium-, abietyl-, stearyl-, di(2-ethylhexyl)- or triethyl-ammonium salt) that acts as a dispersant, as a result of which the rheological and coloristic properties are said to be improved.

In the prior art, the dispersants most commonly used are calcium sulfonates. In the case of the ammonium sulfonates that are occasionally used, however, there is confusing variety in the cations to be used, without any pointers being given to possible further improvements, apart from the occasional reference to the necessity for at least one long-chain group to be present in the case of phthalocyanine pigments.

In all the cases mentioned above, however, rheology, dispersibility, flocculation, flooding, gloss and colour strength are still unable to meet satisfactorily all of the ever growing demands. In addition, for various pigment types there are used pigment derivatives that have a variety of cations. In the case of formulations, therefore, a situation sometimes arises in which cations are exchanged, giving rise to impairment of the application-related properties for a reason that has been totally unrecognised hitherto.

According to this invention it has now been found, surprisingly, that it is possible to avoid the above-mentioned disadvantages and, especially, to obtain pigment compositions that are greatly improved in respect of rheology when sulfonated pigment derivatives having certain quaternary ammonium cations as cations are used as dispersants.

The invention therefore relates to a composition comprising (a) a pigment of the 1-aminoanthraquinone, anthanthrone, anthrapyrimidine, quinacridone, dioxazine, diketopyrrolopyrrole, flavanthrone, indanthrone, isoindolinone, isoviolanthrone, perinone, perylene, phthalocyanine, pyranthrone or thioindigo series, or a solid solution or a mixed crystal consisting of a plurality of such pigments, and (b) a sulfonation product of a pigment of the same series as pigment (a) or as the host component in the solid solution (a) or in the mixed crystal (a), wherein in the sulfonaton product the pigment is substituted by at least one group of formula (I)

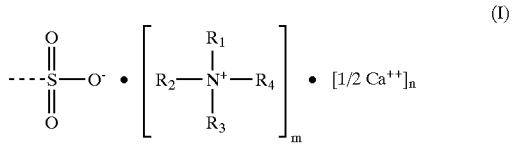

wherein $R_1$ is methyl or ethyl, $R_2$, $R_3$ and $R_4$ are each independently of the others $C_6$–$C_{24}$alkyl or $C_6$–$C_{24}$alkenyl, m is a number from 0.3 to 1.0 and n is a number from 0 to (1.0-m).

$R_1$ is preferably methyl. $R_2$, $R_3$ and $R_4$ are preferably $C_8$–$C_{18}$alkyl or $C_8$–$C_{18}$alkenyl, $C_8$–$C_{18}$alkyl. $R_2$ and $R_3$ are especially identical and, independently of $R_4$, are each $C_8$–$C_{10}$alkyl $R_2$, $R_3$ and $R_4$ are more especially all identical $C_8$–$C_{10}$alkyl groups.

$C_6$–$C_{24}$Alkyl and $C_6$–$C_{24}$alkenyl may be linear or branched. $C_6$–$C_{24}$Alkyl and $C_6$–$C_{24}$alkenyl are preferably branched. $R_2$, $R_3$ and $R_4$ are preferably secondary groups, especially 2-($C_6$–$C_{24}$)-alkyl or 2-($C_6$–$C_{24}$)alkenyl, for example 2-hexyl, 2-ethyl-hexyl, 2-octyl, 2-decyl or 2-dodecyl.

The numbers m and n are statistical average values, based on the total number of all the sulfonate groups. m is preferably a number from 0.3 to 0.8, especially a number from 0.4 to 0.6. n is preferably a number from 0.1 to 0.7, especially a number from 0.6 to 0.4.

The sum of m and n is at most 1.0 but may perfectly well be less than 1.0. In the latter case any other cations may be present in an amount which corresponds to a balanced charge in the sulfonate salt. Those other cations may be, for example, alkali metal, alkaline earth metal or transition metal cations, any known ammonium cations, or alternatively protons. The sum of m and n is preferably at least the number 0.7, especially at least the number 0.9, more especially the number 1, any supplementary cations preferably being $H^+$, $Na^+$, ½ $Mg^{++}$ or quaternary ammonium ions.

Pigment (a) may also be a mixture of pigments of different chromophores and/or structure, for example a mixture of from 2 to 10 pigments, preferably from 2 to 5 pigments, especially 2 or 3 pigments.

The amount of sulfonation product (b) is preferably from 0.1 to 10 mol %, especially from 0.5 to 6 mol %, more especially from 1 to 3 mol %, especially about 2 mol %, based on pigment (a).

The sulfonation product (b) has, for example, from 1 to 4, preferably at least 1/m, especially 1 or 2, more especially 2, sulfonate groups per molecule of pigment. As in the case of pigment (a), the sulfonation product (b) may also be a mixture of components of different structure. The sulfonation product (b) is preferably a derivative of the same chromophore series as pigment (a). Where there is a plurality of derivatives it is preferable for at least one of them to be of the same chromophore series as pigment (a). When pigment (a) is a mixture of several chromophores, a corresponding mixture of several chromophores is especially suitable for the sulfonation product (b).

It will be understood that it is not necessary for pigment (a) and the sulfonation product (b) to be present separately in the composition according to the invention. On the contrary, as high as possible a proportion of sulfonation product (b) should have been adsorbed on the surface of pigment (a). Ideally, pigment particles consisting of a pigment core and a surface layer of sulfonation product (b) are obtained. Such products can also be obtained selectively by partially sulfonating a pigment on the surface by means of methods known per se and then converting the resulting sulfonation products into products of formula (I).

The invention relates accordingly also to a surface-sulfonated pigment, mixed crystal or solid solution of the 1-aminoanthraquinone, anthanthrone, anthrapyrimidine, quinacridone, dioxazine, diketopyrrolopyrrole, flavanthrone, indanthrone, isoindolinone, isoviolanthrone, perinone, perylene, phthalocyanine, pyranthrone or thioindigo series, wherein the pigment, the mixed crystal or the solid solution has on its surface sulfonate groups of the formula (I),

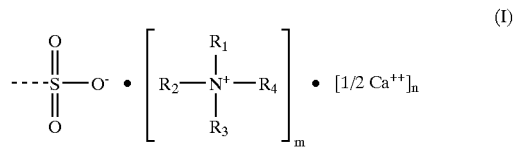

wherein $R_1$ is methyl or ethyl, $R_2$, $R_3$ and $R_4$ are each independently of the others $C_6$–$C_{24}$alkyl or $C_6$–$C_{24}$alkenyl, m is a number from 0.3 to 1.0 and n is a number from 0 to (1.0-m).

Solid solutions or mixed crystals usually consist of from 2 to 5, preferably 2 or 3, components.

The sulfonation products (b) themselves are new and are therefore likewise a subject of the invention. The invention relates accordingly also to a compound of the 1-aminoanthraquinone, anthanthrone, anthrapyrimidine, quinacridone, dioxazine, diketopyrrolopyrrole, flavanthrone, indanthrone, isoindolinone, isoviolanthrone, perinone, perylene, phthalocyanine, pyranthrone or thioindigo series, which compound has one or more sulfonate groups of formula (I)

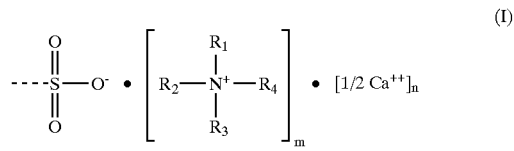

wherein $R_1$ is methyl or ethyl, $R_2$, $R_3$ and $R_4$ are each independently of the others $C_6$–$C_{24}$alkyl or $C_6$–$C_{24}$alkenyl, m is a number from 0.3 to 1.0 and n is a number from 0 to (1.0-m).

Of the claimed sulfonated compounds, special preference is given to those having 1 or 2 sulfonate groups wherein m is equal to 1, and to those having 2 sulfonate groups wherein m and n are each equal to 0.5 (that is to say formally a calcium di{pigment chromophore}sulfonate having on each of the two chromophore molecules a second sulfonate group neutralised with an ammonium cation according to the invention).

The sulfonated pigments according to the invention can be used, for example, as dispersants and enhancers of tinctorial properties in all kinds of pigmented systems.

The composition according to the invention may consist exclusively of pigment (a) and the sulfonation product (b) or further customary constituents may be added in customary amounts, for example (but on no account exclusively) binders or solvents in which pigment (a) and the sulfonation product (b) are dispersed. It is thus readily possible to prepare compositions for all the applications known to the person skilled in the art, for example coating compositions, inks, masterbatches, photocurable compositions and many more. As dispersants or solvents it is also possible to use monomers, which are subsequently polymerised, or water.

The invention therefore relates also to a dispersion of a pigment (a) and a sulfonation product (b) in accordance with the above-mentioned definitions in a binder and/or solvent. The amount of binder and/or solvent is, for example, from 0.3 to 10 000 parts by weight, based on 1 part by weight of pigment (a).

Pigments of the chromophore series according to the invention are, for example, Colour Index Pigment Yellow 24, 108, 109, 110, 123, 147, 173, 193, 199, Pigment Orange 40, 43, 48, 49, 51, 61, 71, 73, Pigment Red 88, 89, 122, 149, 168, 177, 178, 179, 181, 190, 192, 194, 202, 204, 206, 207, 209, 216, 224, 226, 254, 255, 262, 264, 270, 272, Pigment Violet 19, 23, 29, 31, 37, 42, Pigment Blue 15, 15:1, 15:2, 15:3, 15:4, 15:6, 16, 60, 64, Pigment Green 7, 36, Pigment Black 31, 32, Vat Red 74, 3,6-di(3'-cyano-phenyl)-2,5-dihydro-pyrrolo[3,4-c]pyrrole1,4-dione and 3-phenyl-6-(4'-tert-butyl-phenyl)-2,5-dihydropyrrolo-[3,4-c]pyrrole-1,4-dione.

The pigments (a) according to the invention therefore comprise known chromophores, preferably

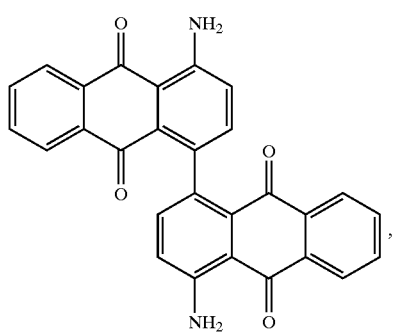

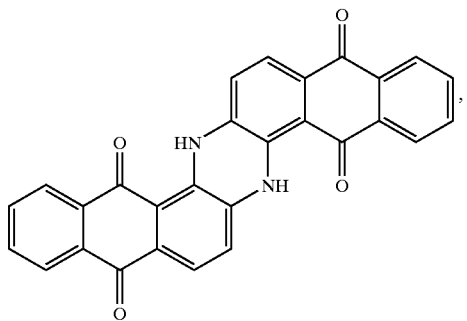

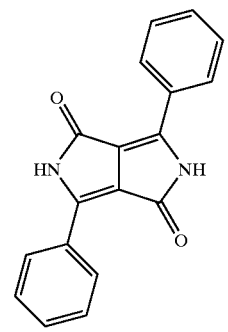

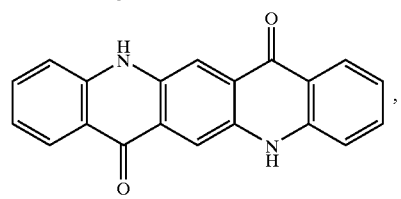

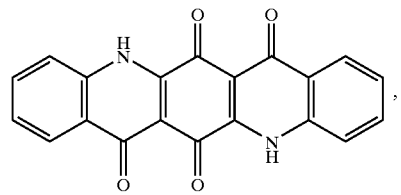

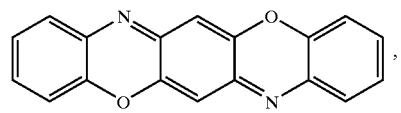

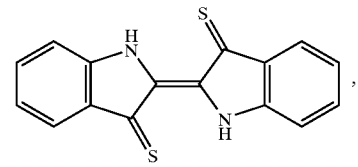

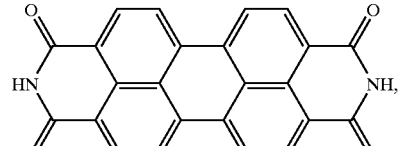

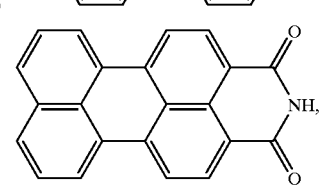

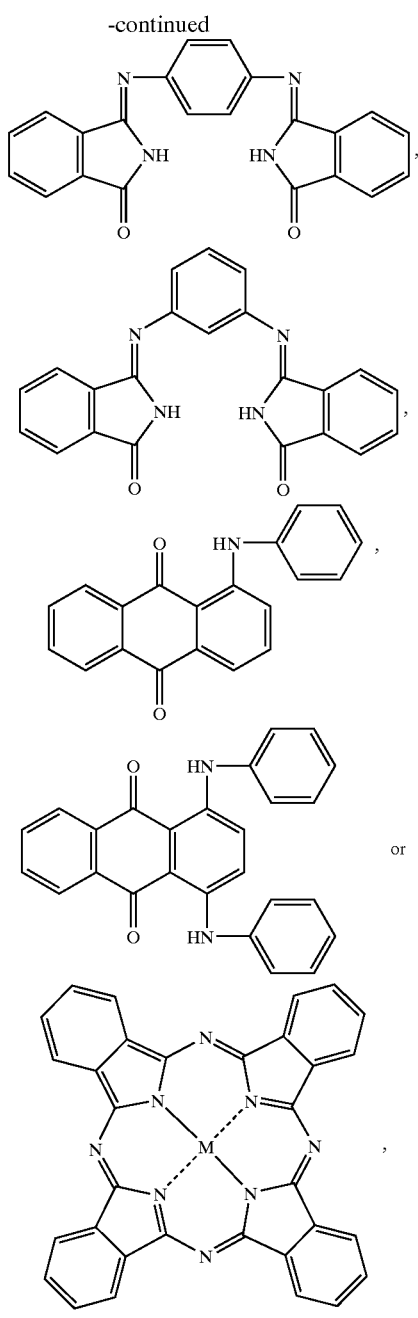

wherein M is H₂ or a metal (for example Cu). Those chromophores may, of course, have the customary substituents.

In all the pigment sulfonates according to the invention, especially in the chromophores indicated above, the sulfonate groups according to the invention are preferably bonded directly to a phenyl or phenylene of the chromophore.

Special preference is given to pigments of the 1-aminoanthraquinone, quinacridone, dioxazine, diketopyrrolopyrrole, indanthrone, perylene or phthalocyanine series and to solid solutions consisting of those pigments. Pigments of the 1-aminoanthraquinone, quinacridone, diketopyrrolopyrrole or indanthrone series are very especially preferred.

Greatest preference is given to:

a) of the 1-aminoanthraquinone series, the dianthraquinonyl pigment of formula

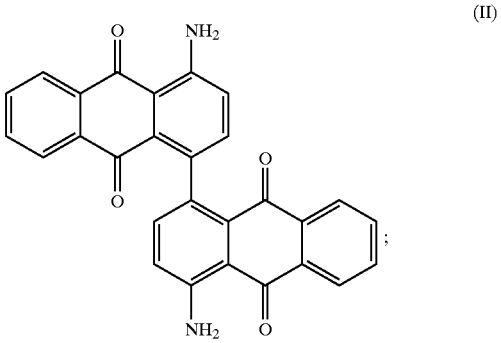

b) of the quinacridone series, quinacridones of formula

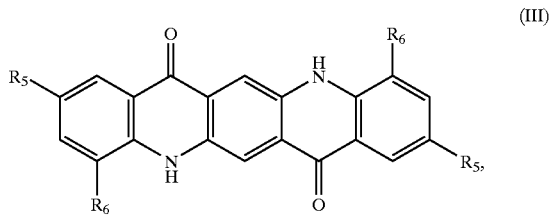

wherein $R_5$ and $R_6$ are each independently of the other hydrogen, halogen, $C_1$–$C_{24}$alkyl, $C_1$–$C_6$alkoxy or phenyl;

c) of the diketopyrrolopyrrole series, pyrrolo[3,4c] pyrroles of formula

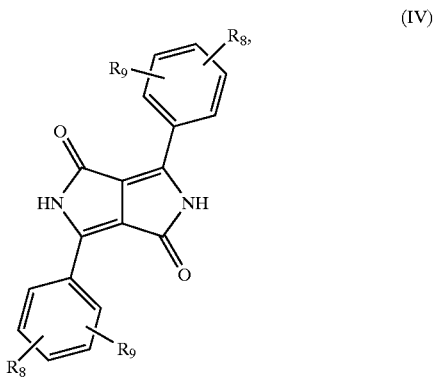

wherein $R_8$ and $R_9$ are each independently of the other hydrogen, methyl, tert-butyl, chlorine, bromine, CN or phenyl;

d) of the indanthrone series, indanthrones of formula

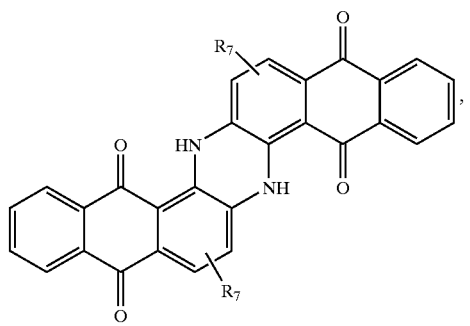

(V)

wherein $R_7$ is hydrogen or halogen; and e) of the phthalocyanine class, phthalocyanines of formula

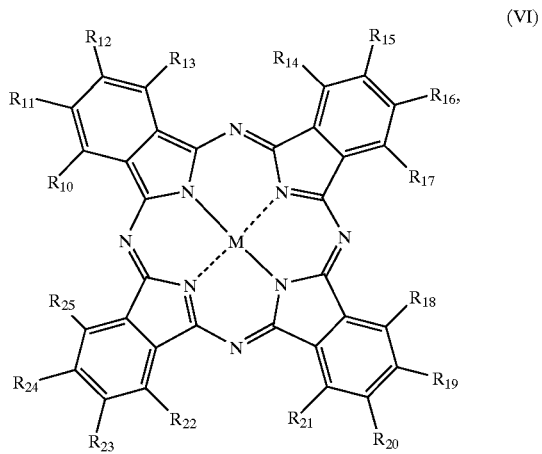

(VI)

wherein M' is Cu or Ni and $R_{10}$ to $R_{25}$ are each independently of the others hydrogen or halogen.

Preferably, also, at least $R_{10}$ or $R_{11}$ is hydrogen and at least $R_{12}$ or $R_{13}$ is chlorine and, especially preferably, of the 16 radicals $R_{10}$ to $R_{25}$, 1, 2, 3, 4, 5, 6 or 7 radicals are chlorine, 1, 2, 3, 4, 5, 6, 7, 8 or 9 radicals are hydrogen and the remaining radicals are bromine. Special mention may also be made of phthalocyanines of formula (VI) wherein 1, 2, 3 or 4 radicals are chlorine and all the remaining radicals are hydrogen, and mixtures thereof. The person skilled in the art will understand that those compounds can be used either in pure form or in the form of mixtures of isomers or homologues. Irrespective of $R_{10}$ to $R_{25}$, M' is always preferably Cu.

All preferences indicated for the pigment compositions apply analogously also to the surface-sulfonated pigments, to the sulfonates themselves and to the dispersions and to all the applications thereof.

The compositions according to the invention can be prepared in simple manner by intimately mixing the components together in accordance with methods known per se to the person skilled in the art, for example by means of high-speed mixing, dry grinding, wet grinding, kneading or extrusion or, surprisingly, simply in a paddle drier. It has been found that intimate mixing in accordance with known methods gives satisfactory results, it being assumed that (b) is at least partly adsorbed on (a). The components (a) or (b), or both components, are preferably used in the form of aqueous press cakes which are suspended in water. Special preference is given to the use of sulfonation product (b) in the form of an alkali metal salt (for example the sodium salt), and only after the intimate dispersion are the sodium cations exchanged for the cations indicated in formula (I), for example by the addition of a quaternary ammonium chloride or hydroxide and optionally calcium chloride. The resulting dispersion can then, for example, be filtered and washed with water, dried, ground and screened.

The dispersions according to the invention can be obtained both by dispersion of the compositions according to the invention and by direct dispersion of components (a) or (b).

The pigment compositions according to the invention are distinguished especially by excellent rheology as well as the highest dispersibility and dispersion stability, high colour saturation and a most astonishingly high colour strength. They have very attractive shades with excellent fastness properties, highly attractive transparency and excellent gloss.

The pigment compositions, pigments, dispersions and compounds according to the invention can be used, for example, for the mass-colouring of high molecular weight organic materials. In addition to the pigmenting of plastics, surface-coatings and printing inks, they are also suitable for producing solid toners, wax transfer ribbons or colour filters.

The high molecular weight organic material to be coloured according to the invention may be of natural or synthetic origin and generally has a molecular weight in the range of from $10^3$ to $10^8$ g/mol. It may be, for example, a natural resin or a drying oil, rubber or casein, or a modified natural material, such as chlorinated rubber, an oil-modified alkyd resin, viscose, a cellulose ether or ester, such as cellulose acetate, cellulose propionate, cellulose acetobutyrate or nitrocellulose, but especially a totally synthetic organic polymer (thermosetting plastics and thermoplastics), as are obtained by polymerisation, polycondensation or polyaddition, for example polyolefins, such as polyethylene, polypropylene or polyisobutylene, substituted polyolefins, such as polymerisation products of vinyl chloride, vinyl acetate, styrene, acrylonitrile, acrylic acid esters and/or methacrylic acid esters or butadiene, and copolymerisation products of the mentioned monomers, especially ABS or EVA.

From the group of the polyaddition resins and polycondensation resins there may be mentioned the condensation products of formaldehyde with phenols, so-called phenoplasts, and the condensation products of formaldehyde with urea, thiourea and melamine, so-called aminoplasts, the polyesters used as surface-coating resins, either saturated, such as alkyd resins, or unsaturated, such as maleic resins, also linear polyesters and polyamides or silicones.

The mentioned high molecular weight compounds may be present individually or in mixtures, in the form of plastic compositions or melts, which may optionally be spun to form fibres.

They may also be present in the form of their monomers or in the polymerised state in dissolved form as film-forming agents or binders for surface-coatings or printing inks, such as boiled linseed oil, nitrocellulose, alkyd resins, melamine resins, urea-formaldehyde resins or acrylic resins.

Pigmenting of the high molecular weight organic materials with the pigment compositions or sulfonated compounds according to the invention is carried out, for example, by mixing such a pigment composition, or an above-mentioned pigment and such a sulfonated compound, optionally in the form of a masterbatch, into the substrates using rolling mills, mixing apparatus or grinding apparatus. The pigmented material is then generally brought into the desired final form by methods known per se, such as calendering, compression moulding, extrusion, spread-coating, casting or by injection moulding. It is often desirable, in order to produce non-rigid mouldings or to reduce their brittleness, to incorporate so-called plasticisers into the high molecular weight compounds prior to shaping. There may be used as plasticisers, for example, esters of phosphoric acid, phthalic acid or sebacic acid. The plasticisers may be incorporated in the process according to the invention before or after the incorporation of the pigment into the polymers. It is also possible, in order to achieve different colour shades, to add to the high molecular weight organic materials also fillers or other colour-imparting constituents, such as white, coloured or black pigments as well as special-effect pigments, in each case in the desired amount.

For the pigmenting of surface-coatings and printing inks, the high molecular weight organic materials and the pigment compositions according to the invention or pigments together with the sulfonated compounds according to the invention, optionally together with additives such as fillers, other pigments, siccatives or plasticisers, are generally finely dispersed or dissolved in an organic and/or aqueous solvent or solvent mixture. The procedure may be such that the individual components are dispersed or dissolved separately, or several are dispersed or dissolved together, and only then are all the components combined.

A further embodiment therefore relates also to mass-coloured high molecular weight organic material comprising
(a) from 0.05 to 70% by weight, based on the sum of (a) and (b), of a composition according to the invention, and
(b) from 99.95 to 30% by weight, based on the sum of (a) and (b), of a high molecular weight organic material.

The material may take the form of a ready-to-use composition or an article formed therefrom, or it may take the form of a masterbatch, for example in granular form. If required, the high molecular weight organic material coloured in accordance with the invention may also comprise customary additives, for example stabilisers or further inorganic, metal or organic pigments, such as rutile, carbon black, aluminium flakes, mica, which may or may not be coated, or any desired coloured pigments.

A further embodiment therefore relates also to a method for the mass-colouring of high molecular weight organic material, wherein a pigment (a) and a sulfonation product (b), optionally in the form of a composition according to the invention or in the form of a surface-modified pigment, are incorporated into that material, for example by mixing and processing the high molecular weight organic material with the pigment composition according to the invention, optionally in the form of a masterbatch, in a manner known per se.

In use, pigment compositions according to the invention exhibit properties that are very surprisingly better than comparable pigment compositions of the prior art. They have good general properties, such as fastness to heat, light, weathering, migration and solvents, and a high colour strength combined with high colour saturation. In addition, they exhibit, especially, excellent rheology, dispersibility and dispersion stability.

A preferred application is in surface-coatings, for example automotive lacquers, where they allow a higher proportion of pigment combined with a high degree of gloss. Owing to their excellent transparency, they are particularly suitable also for special-effect coatings.

The following Examples illustrate the invention but do not limit the scope thereof (unless otherwise indicated, "%" always denotes % by weight):

EXAMPLE 1

180 g of a moist press cake (dry content 33%) of C.I. Pigment Red 254 and 4.2 g of a moist press cake (dry content 28.6%) of the sulfonation product according to Example 1b) of GB-B-2 238 550 are dispersed in 500 ml of water. After one hour's stirring at 23° C., a solution of 1.2 g of methyl-tri(2-octyl)ammonium chloride in 30 ml of water is added. The suspension is stirred for a further one hour and then filtered. The filtration residue is washed thoroughly with water and dried at 80° C. and 50 mbar.

EXAMPLE 2

120 g of a moist press cake (dry content 25%) of C.I. Pigment Red 177 and 0.6 g of 4,4'-diamino-1,1'-dianthraquinonyl-3,3'-disulfonic acid are dispersed in 200 ml of water. After one hour's stirring at 23° C., first a solution of 0.6 g of methyl-tri(2-octyl)ammonium chloride in 30 ml of water and then a solution of 4.44 g of $CaCl_2 \cdot 6 H_2O$ in 40 ml of water are added. The suspension is stirred for a further one hour and then filtered. The filtration residue is washed thoroughly with water and dried at 80° C. and 50 mbar.

EXAMPLE 3

48.2 g of a moist press cake (dry content 49.75%) of C.I. Pigment Blue 60 and 0.48 g of disulfonated indanthrone blue are dispersed in 220 ml of water. After one hour's stirring at 23° C., first a solution of 0.6 g of methyl-tri(2-octyl) ammonium chloride in 30 ml of water and then a solution of 4.44 g of $CaCl_2 \cdot 6 H_2O$ in 40 ml of water are added. The suspension is stirred for a further one hour and then filtered. The filtration residue is washed thoroughly with water and dried at 80° C. and 50 mbar.

EXAMPLE 4

2.0 g of the product according to Example 1 are dispersed in the following polyester surface-coating system for three hours using a customary method:

5.5 g of ®Dynapol H700 (Dynamit Nobel)

0.6 g of ®Solsperse 24000 (Avecia)

4.8 g of xylene 7.1 g of butyl acetate

The dispersions are made up into a lacquer with 2.2 g of ®Maprenal MF 650 (Hoechst) and 4.5 g of a 20% solution of cellulose acetobutyrate in butanol/xylene 2:1 (®CAB 531.1, Eastman Chem.). The application of the resulting colour lacquer is effected by discharging it onto a glass plate. Prior to stoving in a circulating-air drying cabinet (30' at 120° C.), the plate is exposed to air for 20 minutes at an inclination of 90°. The gloss values, measured using a gloss meter (™ZGM 1020, Zehntner) at an inclination of 20° in accordance with DIN 67530, are higher than those of pigments treated according to Example 7 of GB-B-2 238 550.

EXAMPLE 5

The procedure of Example 4 is followed, but the composition according to Example 2 is used instead of the composition according to Example 1. The gloss values are higher than those of pigments treated according to U.S. Pat. No. 4,863,522.

EXAMPLE 6

The procedure of Example 4 is followed, but the composition according to Example 3 is used instead of the composition according to Example 1. The gloss values are higher than those of pigments treated according to Example 15 of U.S. Pat. No. 4,692,189.

EXAMPLE 7

To determine the flow behaviour, dispersions according to Example 1 are tested using a ®Rotovisco RV20 viscometer (HAAKE, measurement temperature 25° C., measuring system SV-SP, shear range 0–500 s$^{-1}$). The lacquer dispersions obtained with the product according to Example 1 exhibit significantly better flow behaviour than that of pigments treated according to Example 7 of GB-B-2 238 550.

EXAMPLE 8

The procedure of Example 7 is followed, but the composition according to Example 2 is used instead of the composition according to Example 1. The flow behaviour is better than that of pigments treated according to U.S. Pat. No. 4,863,522.

EXAMPLE 9

The procedure of Example 7 is followed, but the composition according to Example 3 is used instead of the composition according to Example 1. The flow behaviour is better than that of pigments treated according to Example 15 of U.S. Pat. No. 4,692,189.

EXAMPLE 10

A laboratory kneader of 0.75 litre capacity is charged with 50 g of C.I. Pigment Blue 60, 180 g of sodium chloride and 104 ml of diacetone alcohol and the speed is set at 80 rev/min. The walls of the kneader are cooled to 40° C., so that the temperature in the mass does not exceed 60° C. After 5 hours and 45 minutes, 1.5 g of monosulfonated indanthrone (cf. Ukr. Khim. Zh. 57/9, 969–975 [1991] or U.S. Pat. No. 4,692,189), 1.5 g of mono-sulfonated copper phthalocyanine and 1.8 g of methyl-tri(2-octyl)ammonium chloride are added. 15 minutes later, 150 ml of deionised water are slowly added, the resulting mixture is discharged into a Büchner funnel and then washed with water until the water is salt-free. The product is dried at 80° C./8–10$^3$ Pa. The product exhibits excellent rheological, gloss and flow properties.

EXAMPLE 11

182 g of a moist press cake (dry content 33%) of C.I. Pigment Red 254 and 4.2 g of a moist press cake (dry content 28.6%) of the sodium salt of a sulfonated mixture of diketopyrrolopyrroles obtained according to Example 1a+b of DE-40 37 556 are together suspended in 200 ml of water. The pH is adjusted to 7 with dilute NaOH solution. 1.2 g of methyl-tri(2-octyl)ammonium chloride in 60 ml of water are slowly added. The suspension is stirred for a further one hour and then filtered. The filtration residue is washed thoroughly with water and dried at 80° C. and 150 mbar. The product exhibits excellent rheological, gloss and flow properties.

EXAMPLE 12

47 g of pulverulent C.I. Pigment Red 264 and 2.8 g of a moist press cake (dry content 28.6%) of the sodium salt of a sulfonated mixture of diketopyrrolopyrroles obtained according to Example 1a+b of DE-40 37 556 are together suspended in 150 ml of water. The pH is adjusted to 7 with dilute NaOH solution. 0.8 g of methyl-tri(2-octyl) ammonium chloride in 40 ml of water are slowly added. The suspension is stirred for a further one hour and then filtered. The filtration residue is washed thoroughly with water and dried at 80° C. and 150 mbar. The product exhibits excellent rheological, gloss and flow properties.

EXAMPLE 13

The procedure of the preceding Examples is followed, but trichloro-copper phthalocyanine prepared according to Example 6 of FR-1.446.175 is used as pigment and tri(2-octyl)-methylammonium copper phthalocyanine monosulfonate (1% by weight, based on trichloro-copper phthalocyanine) is used as rheology improver. The product exhibits excellent rheological, gloss and flow properties.

EXAMPLES 14–17

The procedure according to Example 4 is followed, but the compositions according to Examples 10–13 are used instead of the composition according to Example 1. The gloss values are excellent in each case.

EXAMPLES 18–21

The procedure according to Example 7 is followed, but the compositions according to Examples 10–13 are used instead of the composition according to Example 1. The flow behaviour is excellent in each case.

EXAMPLES 22–29

The procedure according to Example 13 is followed, but the amount of rheology improver is varied: 0.2%–0.5%–2.0%–4.0%–6.0%–8.0%–11.0%–15.0% by weight, based on trichloro-copper phthalocyanine. The properties are excellent in each case.

EXAMPLE 30

The procedure according to Example 3 is followed, but monosulfonated indanthrone blue is used instead of disulfonated indanthrone blue.

EXAMPLE 31

The procedure according to Example 3 is followed, but a mixture of monosulfonated and disulfonated indanthrone blue (each 50% by weight) is used instead of disulfonated indanthrone blue.

EXAMPLE 32

The procedure according to Example 3 is followed, but 7,16-disulfo-5,6,9,14,15,18-hexahydro-5,9,14,18-tetraoxo-anthrazine [120772-59-0] is used instead of disulfonated indanthrone blue (usually isomeric mixture [25737-27-3]).

What is claimed is:

1. A composition, comprising
   (a) An anthanthrone, anthrapyrimidine, quinacridone, diketopyrrolopyrrole, flavanthrone, indanthrone, isoindolinone, isoviolanthrone, perinone, pyranthrone or thioindigo pigment, or a solid solution or a mixed crystal thereof, and
   (b) a sulfonation product of a pigment of (a) or as a host component in the solid solution (a) or in the mixed crystal (a), wherein in the sulfonation product the pigment is substituted by at least one group of formula (I)

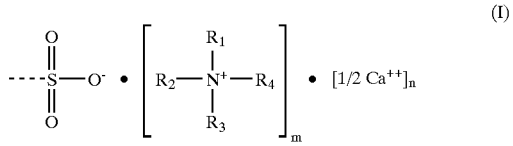

wherein $R_1$ is methyl or ethyl, $R_2$, $R_3$ and $R_4$ are each independently of the others $C_6$–$C_{24}$alkyl or $C_6$–$C_{24}$alkenyl, m is a number from 0.3 to 1.0 and n is a number from 0 to (1.0-m).

2. A composition according to claim 1, wherein $R_1$ is methyl, and $R_2$, $R_3$ and $R_4$ are each $C_8$–$C_{10}$alkyl.

3. A composition according to claim 2, wherein $R_2$, $R_3$ and $R_4$ are each 2-hexyl, 2-ethyl-hexyl, 2-octyl, 2-decyl or 2-dodecyl.

4. A composition according to claim 1, wherein m is a number from 0.4 to 0.6 and n is a number from 0.6 to 0.4.

5. A composition according to claim 1, wherein the amount of sulfonation product (b) is from 0.1 to 10 mol % based on pigment (a).

6. A composition according to claim 1, wherein the sulfonation product (b) has from 1/m to 4 sulfonate groups per molecule of pigment.

7. A composition according to claim 1, wherein pigment (a) is Colour Index Pigment Yellow 24, 108, 109, 110, 173, Pigment Orange 40, 43, 48, 49, 51, 61, 71, 73, Pigment Red 88, 122, 168, 181, 192, 194, 202, 204, 206, 207, 209, 216, 226, 254, 255, 262, 264, 270, 272, Pigment Violet 19, 31, 42, Pigment Blue 60, 64, Vat Red 74, 3,6-di(3'-cyano-phenyl)-2,5-dihydro-pyrrolo[3,4-c]pyrrole-1,4-dione or 3-phenyl-6-(4'-tert-butyl-phenyl)-2,5-dihydro-pyrrolo[3,4-c]pyrrole-1,4-dione.

8. A composition according to claim 1 wherein the composition is a dispersion in a binder and/or solvent.

9. A composition according to claim 5, wherein the amount of sulfonation product (b) is from 1 to 3 mole %, based on pigment (a).

10. A composition according to claim 1, wherein the amount of sulfonation product (b) has 2 sulfonate groups per molecule of pigment.

11. A mass-coloured organic material having a molecular weight in the range from $10^3$ to $10^8$ g/mol comprising
(a) from 0.05 to 70% by weight, based on the sum of (a) and (b), of a composition according to claim 1, and
(b) from 99.95 to 30% by weight, based on the sum of (a) and (b), of said organic material having a molecular weight in the range from $10^3$ to $10^8$ g/mol.

12. A method for the mass-colouring of organic material having a molecular weight in the range from $10^3$ to $10^8$ g/mol, which comprises incorporating into said material a composition according to claim 1.

13. A method for mass-colouring of organic material having a molecular weight in the range from $10^3$ to $10^8$ g/mol, which comprises incorporating a dispersion according to claim 8 into said material.

14. A method for mass-colouring of organic material having a molecular weight in the range from $10^3$ to $10^8$ g/mol, which comprises incorporating a composition according to claim 11 into said material.

15. An anthanthrone, anthrapyrimidine, quinacridone, diketopyrrolopyrrole, flavanthrone, indanthrone, isoindolinone, isoviolanthrone, perinone, pyranthrone or thioindigo pigment, mixed crystal or the solid solution thereof wherein the pigment, the mixed crystal or the solid solution has on its surface sulfonate groups of the formula (I),

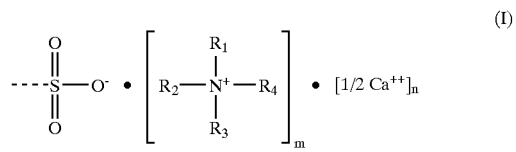

wherein $R_1$ is methyl or ethyl, $R_2$, $R_3$ and $R_4$ are each independently of the others $C_6$–$C_{24}$alkyl or $C_6$–$C_{24}$alkenyl, m is a number from 0.3 to 1.0 and n is a number from 0 to (1.0-m).

16. A method for mass-colouring of organic material having a molecular weight in the range from $10^3$ to $10^8$ g/mol, which comprises incorporating a pigment, a mixed crystal or a solid solution according to claim 15 into said material.

17. An anthanthrone, anthrapyrimidine, quinacridone, diketopyrrolopyrrole, flavanthrone, indanthrone, isoindolinone, isoviolanthrone, perinone, pyranthrone or thioindigo compound, which compound has one or more sulfonate groups of formula (I)

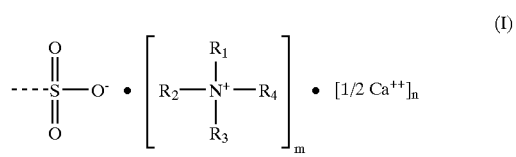

wherein $R_1$ is methyl or ethyl, $R_2$, $R_3$ and $R_4$ are each independently of the others $C_6$–$C_{24}$alkyl or $C_6$–$C_{24}$alkenyl, m is a number from 0.3 to 1.0 and n is a number from 0 to (1.0-m).

18. A method for mass-colouring of organic material having a molecular weight in the range from $10^3$ to $10^8$ g/mol, which comprises incorporating a compound according to claim 17 into said material.

* * * * *